United States Patent
Zhang et al.

(10) Patent No.: US 11,482,927 B2
(45) Date of Patent: Oct. 25, 2022

(54) SWITCHED CAPACITOR CONVERTER AND DRIVING CIRCUIT

(71) Applicant: Silergy Semiconductor Technology (Hangzhou) LTD, Hangzhou (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 41 days.

(21) Appl. No.: 17/117,354

(22) Filed: Dec. 10, 2020

(65) Prior Publication Data

US 2021/0194357 A1 Jun. 24, 2021

(30) Foreign Application Priority Data

Dec. 20, 2019 (CN) .......................... 201911326734.8

(51) Int. Cl.
  *H02M 3/07* (2006.01)
  *H02M 1/08* (2006.01)
  *H02M 1/00* (2006.01)
  *H02M 3/158* (2006.01)

(52) U.S. Cl.
  CPC ........... *H02M 3/07* (2013.01); *H02M 1/0006* (2021.05); *H02M 1/08* (2013.01); *H02M 3/1584* (2013.01)

(58) Field of Classification Search
  CPC .... H02M 3/07; H02M 3/1584; H02M 1/0006; H02M 7/4837
  See application file for complete search history.

(56) References Cited

U.S. PATENT DOCUMENTS

| | | |
|---|---|---|
| 5,581,454 A | 12/1996 | Collins |
| 7,696,735 B2 | 4/2010 | Oraw et al. |
| 7,907,429 B2 | 3/2011 | Ramadass et al. |
| 8,427,113 B2 | 4/2013 | Xing et al. |
| 8,687,382 B2 | 4/2014 | Chen |
| 8,729,819 B2 | 5/2014 | Zhao et al. |
| 8,917,528 B2 | 12/2014 | Xu |
| 9,287,782 B2 | 3/2016 | Chen |
| 9,312,773 B2 | 4/2016 | Li |
| 9,473,034 B2 | 10/2016 | Huang et al. |

(Continued)

FOREIGN PATENT DOCUMENTS

| | | |
|---|---|---|
| CN | 204696914 U | 10/2015 |
| CN | 110474531 A | 11/2019 |

*Primary Examiner* — Alex Torres-Rivera (57) ABSTRACT

A driving circuit for a switched capacitor converter having first and second switched capacitor branches, where the first switched capacitor branch includes first and second switch groups connected between an input voltage and a reference ground, the second switched capacitor branch includes third and fourth switch groups connected between the input voltage and the reference ground, and where each switch group includes an upper power switch and a lower power switch, the driving circuit comprising: a plurality of drivers configured to correspondingly drive each power switch in the switched capacitor converter; a bootstrap capacitor that provides a power supply voltage for each driver that is configured to drive the upper power switches that are connected to the input voltage of the switched capacitor converter; and where a charging voltage for charging the bootstrap capacitor is not greater than the input voltage of the switched capacitor converter.

20 Claims, 7 Drawing Sheets

(56) References Cited

U.S. PATENT DOCUMENTS

| | | |
|---|---|---|
| 9,762,128 B2 | 9/2017 | Zhang et al. |
| 9,853,460 B2 | 12/2017 | Ichikawa et al. |
| 2009/0316443 A1 | 12/2009 | Coccia et al. |
| 2012/0300519 A1 | 11/2012 | Clemmons et al. |
| 2013/0181620 A1 | 7/2013 | Zhao |
| 2013/0201730 A1 | 8/2013 | Luo |
| 2013/0265016 A1 | 10/2013 | Chang et al. |
| 2014/0210445 A1* | 7/2014 | Hasegawa ............ H04W 64/006 323/284 |
| 2018/0198367 A1 | 7/2018 | Zhang et al. |
| 2019/0273428 A1* | 9/2019 | Huang ............. H03K 17/04206 |
| 2021/0083573 A1* | 3/2021 | Yen ...................... H02M 3/073 |
| 2021/0091655 A1* | 3/2021 | Hegde .................. H02M 7/797 |

* cited by examiner

SWITCHED CAPACITOR CONVERTER AND DRIVING CIRCUIT

RELATED APPLICATIONS

This application claims the benefit of Chinese Patent Application No. 201911326734.8, filed on Dec. 20, 2019, which is incorporated herein by reference in its entirety.

FIELD OF THE INVENTION

The present invention generally relates to the field of power electronics, and more particularly to switched capacitor converters, and associated driving circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
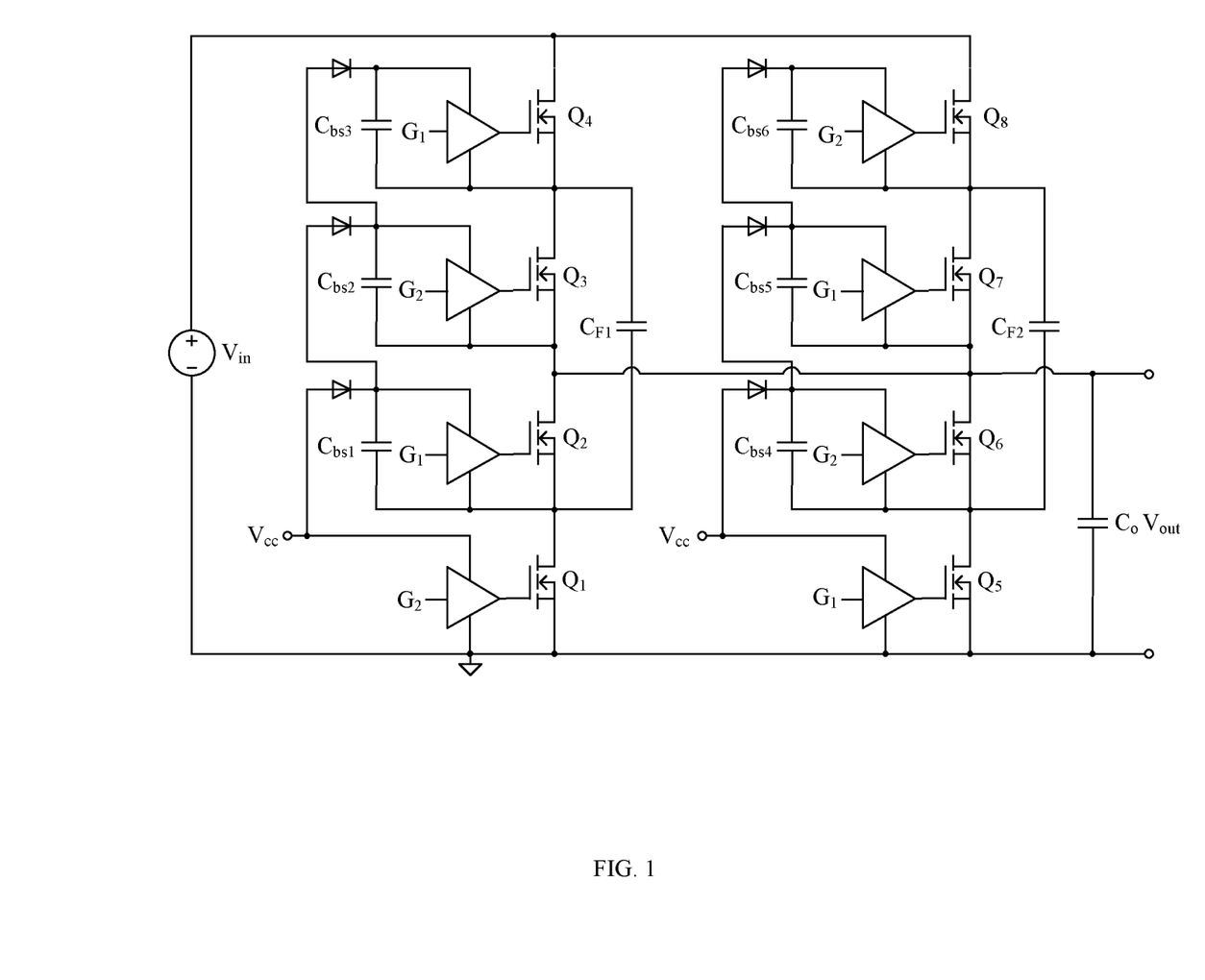
FIG. 1 is a schematic block diagram of an example driving circuit for the two-phase switched capacitor converter.

A switched capacitor converter realizes voltage conversion by controlling the charging and discharging of capacitors via switches. In a switched capacitor converter, since the number of power switches is large and the driving signals are required to be isolated, multiple bootstrap capacitors may be applied in the driving circuit for the switched capacitor converter to provide the corresponding driving voltage. However, the bootstrap capacitors must be placed outside the chip, which causes increase of the volume of the system and is not conductive to system integration. Referring now to FIG. 1, shown is a schematic block diagram of an example driving circuit for the two-phase switched capacitor converter. In this example, except that the driving voltages of power switches Q1 and Q5 are directly provided by reference voltage source VCC, the driving voltages of other switches (Q2-Q4 and Q6-Q8) are provided by bootstrap capacitors Cbs1-Cbs6. In this case, the volume of the system is increased, which is not conducive to improve the integration of the system.

Figure 2:
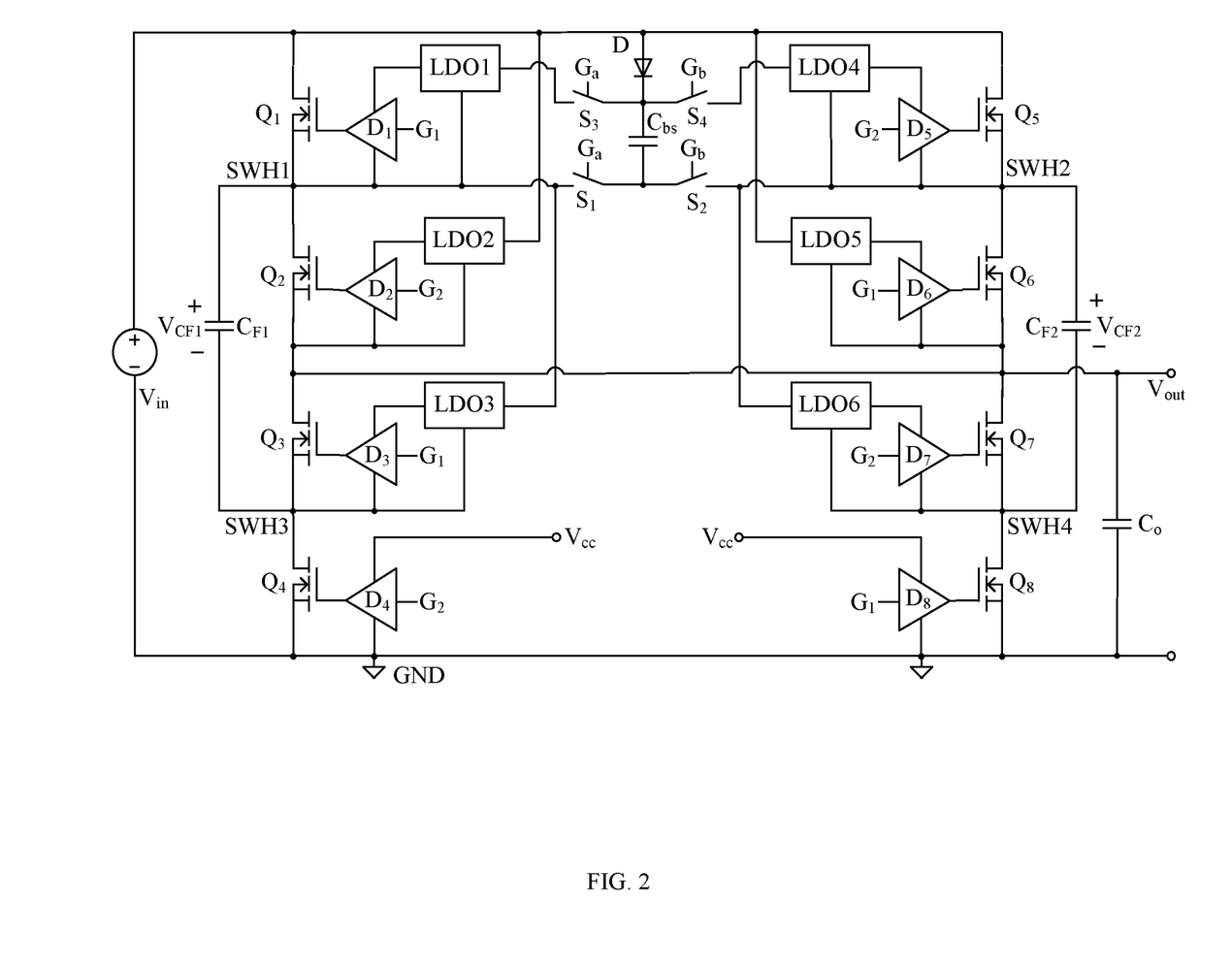
FIG. 2 is a schematic block diagram of a first example driving circuit for the switched capacitor converter, in accordance with embodiments of the present invention.

Referring now to FIG. 2, shown is a schematic block diagram of an example driving circuit for the switched capacitor converter, in accordance with embodiments of the present invention. In this particular example, a two-phase switched capacitor converter can include a main power circuit and a driving circuit. For example, the main power circuit can include two switched capacitor branches and each switched capacitor branch can include two switch groups connected in series between input voltage Vin and reference ground GND. Moreover, each switch group can include two power switches connected in series, i.e., an upper power switch and a lower power switch. In addition, each switched capacitor branch can include flying capacitors, and each flying capacitor can connect between the common terminal of two power switches in one switch group and the common terminal of two power switches in another switch group. In particular embodiments, the first switched capacitor branch can include a first switch group and a second switch group.

For example, the first switch group can include upper power switch Q1 and lower power switch Q2, and the second switch group can include upper power switch Q3 and lower power switch Q4. In the first switched capacitor branch, power switches Q1, Q2, Q3, and Q4 can connect in series between input voltage Vin and reference ground GND in sequence. Also, flying capacitor CF1 can connect between common terminal SWH1 of power switches Q1 and Q2 and common terminal SWH3 of power switches Q3 and Q4. Further, the second switched capacitor branch can include a third switch group and a fourth switch group. For example, the third switch group can include upper power switch Q5 and lower power switch Q6, and the fourth switch group can include upper power switch Q7 and lower power switch Q8. In the second switched capacitor branch, power switches Q5, Q6, Q7, and Q8 can connect in series between input voltage Vin and reference ground GND in sequence. Also, flying capacitor CF2 can connect between second common terminal SWH2 of power switches Q5 and Q6 and common terminal SWH4 of power switches Q7 and Q8. It should be understood that the number of the switch groups in each switched capacitor branch is not limited to two per this particular example.

In addition, each power switch may be controlled by the corresponding driver. In particular embodiments, the driving circuit can include multiple drivers corresponding to the power switches. For example, power switches Q1-Q8 may be controlled by driver D1-D8 respectively in order. Here, driver D4 and driver D8 can connect with reference ground GND and a supply voltage for driver D4 and driver D8 may be provided by reference voltage source VCC. Further, the driving circuit can include voltage regulator LDO1-LDO6 and the output terminals of voltage regulator LDO1-LDO6 can connect with the power supply terminal of drivers D1-D3 and drivers D5-D7, respectively and in order.

In addition, a low dropout (LDO) linear regulator may be utilized for the voltage regulator in some embodiments. It should be understood that the voltage regulator is to achieve voltage conversion and generate a stable voltage, and any voltage regulator with this function can utilized in certain embodiments. Further, the driving circuit can include bootstrap capacitor Cbs, diode D, and two groups of selection switches. In particular embodiments, bootstrap capacitor Cbs is charged by input voltage Vin. When bootstrap capacitor Cbs is discharged, two terminals of bootstrap capacitor Cbs can be coupled to positive and negative power supply terminals of drivers D1 or D5, selectively, in order to provide the power supply voltage.

For example, the anode of diode D can connect with positive input voltage Vin, and the cathode of diode D can connect with the anode of bootstrap capacitor Cbs. The first group of selection switches can include switches S1 and S2, configured to couple the cathode of bootstrap capacitor Cbs with one of the negative power supply terminals of drivers D1 and D5 selectively. Moreover, switch S1 can connect between common terminal SWH1 (e.g., the negative power supply terminal of driver D1) and to the cathode of bootstrap capacitor Cbs, and switch S2 can connect between common terminal SWH2 (e.g., the negative power supply terminal of driver D5) and to the cathode of bootstrap capacitor Cbs. In addition, the second group of selection switches can include switches S3 and S4 configured to connect the anode of bootstrap capacitor Cbs with one of the positive power supply terminals of driver D1 and driver D5 selectively. Moreover, switch S3 can connect between the input terminal of voltage regulator LDO1 and to the anode of bootstrap capacitor Cbs, and switch S4 can connect between the input terminal of voltage regulator LDO4 and to the anode of bootstrap capacitor Cbs. That is, bootstrap capacitor Cbs may selectively provide the power supply voltage for one of drivers D1 and D5 by multiplexing bootstrap capacitor Cbs and controlling the selection switches.

In particular embodiments, power switches Q1 and Q3 in the first switched capacitor branch, and power switches Q6 and Q8 in the second switched capacitor branch (described as a first driving group), may be controlled by driving signal G1. In addition, power switches Q2 and Q4 in the first switched capacitor branch, and power switches Q5 and Q7 in the second switched capacitor branch (described as a second driving group), may be controlled by driving signal G2. Switches S1 and S3 can be controlled by control signal Ga, and switches S2 and S4 may be controlled by control signal Gb.

Figure 3:
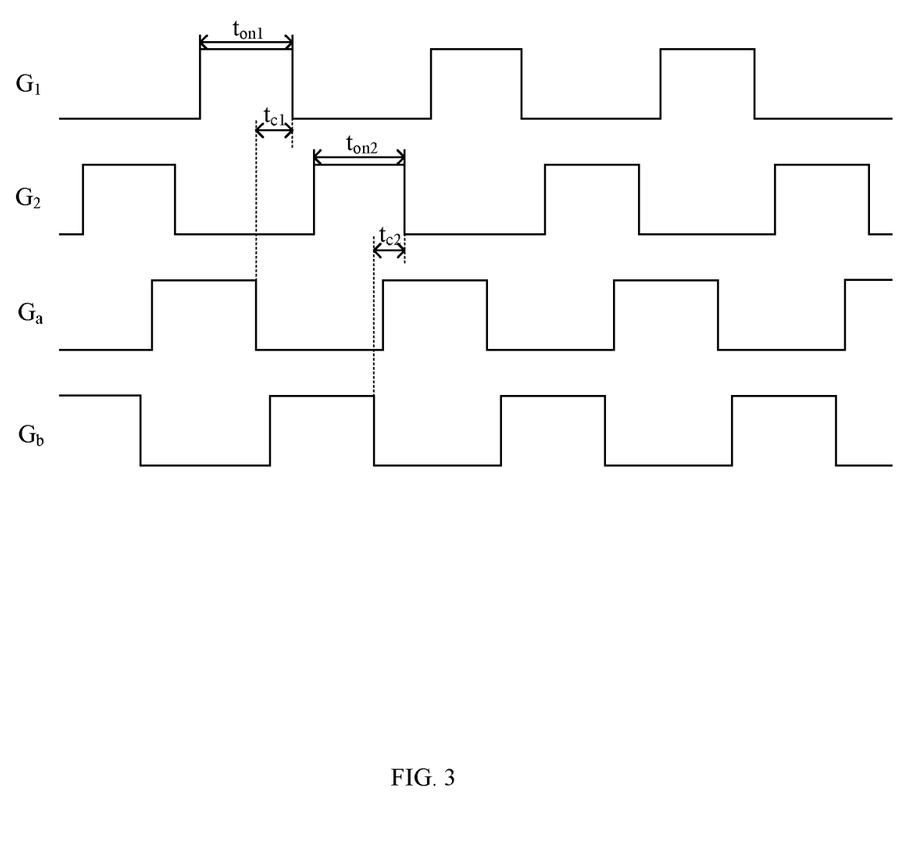
FIG. 3 is a waveform diagram of an example operation of the first example driving circuit for the switched capacitor converter, in accordance with embodiments of the present invention.

Referring now to FIG. 3, shown is a waveform diagram of example operation of the first example driving circuit for the switched capacitor converter, in accordance with embodiments of the present invention. In this particular example, driving signals G1 and G2 are complementary. Further, a dead time can be inserted between driving signals G1 and G2, in order to avoid the upper and lower power switches being turned on simultaneously. Similarly, control signals Ga and Gb may be complementary and a dead time can be inserted between, in order to avoid switches S1 and S2 or switches S3 and S4 being turned on simultaneously. As is shown, the falling edge of control signal Ga can be generated ahead of the falling edge of driving signal G1 by predetermined time tc1; that is, switches S1 and S3 may be turned off in advance of the turn-off time instant of the first driving group by predetermined time tc1. Here, the active time of driving signal G1 is ton1 and tc1 is less than ton1 (e.g., tc1=0.5ton1).

Similarly, the falling edge of control signal Gb may be generated ahead of the falling edge of driving signal G2 by predetermined time tc2; that is, switches S2 and S4 can be turned off in advance of the turn-off time instant of the second driving group by predetermined time tc2. Here, the active time of driving signal G2 is ton2, and tc2 is less than ton2 (e.g., tc2=0.5ton2. In this type of switched capacitor converter, the efficiency may be higher when the duty cycle reaches 50%. Thus, e.g., ton1=ton2 and tc1=tc2. It should be understood that predetermined time tc1 can be different from predetermined time tc2. When the switched capacitor converter operates normally, output voltage Vout may be half of input voltage Vin, and voltage $V_{CF1}$ across capacitor CF1 and voltage VCF2 across capacitor CF2 may be equal to half of input voltage Vin.

Referring back to FIG. 2, during the normal operation of the switched capacitor converter, the voltage received by voltage regulators LDO2 and LDO5 is ½*Vin. Then, voltage regulators LDO2 and LDO5 may respectively provide the power supply voltages for drivers D2 and D6 after voltage conversion, thereby driving power switches Q2 and Q6. Similarly, voltage regulator LDO3 and LDO6 can receive voltage VCF1 and voltage VCF2, respectively. Then, voltage regulator LDO3 and LDO6 may respectively provide the power supply voltages for drivers D3 and D7 after voltage conversion, thereby driving power switches Q3 and Q7. Also, drivers D4 and D8 can be directly powered by reference voltage source VCC. For example, the power supply voltage generated from the voltage regulator may be equal to reference voltage source VCC.

When both driving signal G1 and control signal Gb are at a high level during predetermined time tc1, the switches in the first driving group and switches S2 and S4 can be turned on. Then, input voltage Vin can charge bootstrap capacitor Cbs through diode D and part of the power paths in the switched capacitor converter. Further, the charging paths are Vin-D-Cbs-S2-SWH2-Q6-Vout-GND and Vin-D-Cbs-S2-SWH2-CF2-Q8-GND. Since the voltage VSWH2 at common terminal SWH2 equals voltage VCF2 (=½*Vin) across flying capacitor CF2, the voltage across bootstrap capacitor Cbs is the difference between input voltage Vin and voltage VCF2 (e.g., equals to Vin−½*Vin=½*Vin). Then, the voltage across bootstrap capacitor Cbs may be provided to the input terminals of voltage regulator LDO4 through switches S2 and S4, in order to supply power to driver D5 after conversion.

Further, when driving signal G1 switches to go low, the first driving group can be controlled to be turned off. But, control signal Gb may remain at a high level at that time, so switches S2 and S4 may remain on. Further, when driving signal G2 switches to go high, since voltage regulator LDO4 receives the voltage across bootstrap capacitor Cbs and provides the power supply voltage for driver D5 after conversion, power switch Q5 can be turned on normally. Moreover, other power switches of the second switch group may normally be on. For example, the power supply voltage generated from the voltage regulator can be equal to reference voltage source VCC.

Control signal Gb can go low at a moment that is predetermined time tc2 earlier than the moment when driving signal G2 switches go low, and then control signal Ga switches to be high. Thus, switches S1 and S3 can be turned on and the power switches in the second driving group may remain on during predetermined time tc2. Then, input voltage Vin can charge bootstrap capacitor Cbs through diode D and part of the power paths in the switched capacitor converter. The charging paths are Vin-D-Cbs-S1-SWH1-Q2-Vout-GND and Vin-D-Cbs-S1-SWH1-CF1-Q4-GND. Since voltage VSWH1 at common terminal SWH1 equals to voltage VCF1(=½*Vin) across flying capacitor CF1, the voltage across bootstrap capacitor Cbs may be the difference between input voltage Vin and voltage VCF1 (e.g., equals to Vin−½*Vin=½*Vin). Then, the voltage across bootstrap capacitor Cbs can be provided to the input terminals of voltage regulator LDO1 through switches S1 and S3, in order to supply power to driver D1 after conversion.

When driving signal G2 switches to go low, the second switch group can be controlled to be turned off. But, control signal Ga may remain high at that time, so switches S1 and S3 may remain on. Further, when driving signal G1 switches to go high, since voltage regulator LDO1 receives the voltage across bootstrap capacitor Cbs and provides the power supply voltage for driver D1 after conversion, power switch Q1 can be turned on normally. Moreover, other power switches of the first switch group can be normally on. For example, the power supply voltage generated from the voltage regulator may be equal to reference voltage source VCC.

After that, control signal Ga switches to be low at a moment that is predetermined time tc1 earlier than the moment when driving signal G1 is set at a high level, and then control signal Gb can be set at a high level. Then, bootstrap capacitor Cbs can be charged again and the process is repeated as described above. In certain embodiments, each switched capacitor branch can include two switch groups as one example, and when there are N switch groups, the driver for the power switch that is connected to the input voltage can be powered by the voltage across the bootstrap capacitor, which is 1/N of the input voltage.

As mentioned above, the power supply voltage of the drivers for the power switches connected with the input voltage of the switched capacitor may be provided by multiplexing bootstrap capacitor. In one switching cycle, the charging time of the bootstrap capacitor can coincide with part of the conduction time of one of the two power switches connected with the input voltage, and the bootstrap capacitor may discharge to provide the power supply voltage to the corresponding driver before the another one power switch is turned on. Moreover, the charging voltage of the bootstrap capacitor may be related to the input voltage. For example, the voltage across the bootstrap capacitor can be half of the input voltage. If input voltage Vin is high, this may not be directly provided to the driver. Thus, voltage regulators LDO3 and LDO6 may be utilized in order to convert the higher voltage to a voltage that is suitable for the power supply voltage of the driver. In other cases whereby the input voltage is not high, voltage regulators LDO3 and LDO6 can be ignored.

Figure 4:
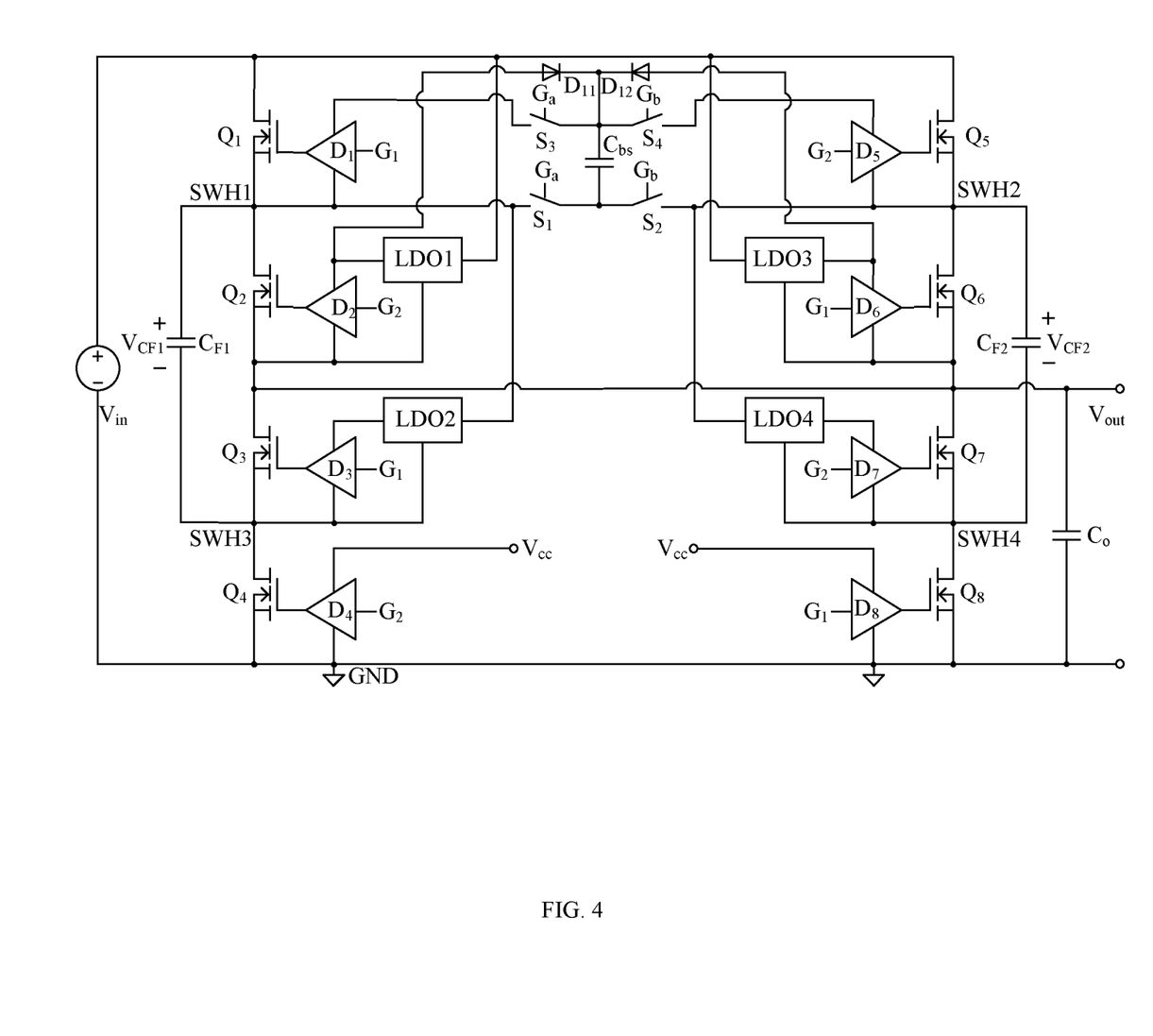
FIG. 4 is a schematic block diagram of a second example driving circuit for the switched capacitor converter, in accordance with embodiments of the present invention.

Referring now to FIG. 4, shown is a schematic block diagram of a second example driving circuit for the switched capacitor converter, in accordance with embodiments of the present invention. In particular embodiments, the driving circuit can include multiple drivers corresponding to the power switches. For example, power switches Q1-Q8 can be controlled by driver D1-D8 respectively in order. Here, drivers D4 and D8 can connect with reference ground GND, and the power supply voltage for drivers D4 and D8 may be provided by reference voltage source VCC. Further, the driving circuit can include voltage regulators LDO1-LDO4, and the output terminals of voltage regulators LDO1-LDO4 can connect with the power supply terminals of drivers D2, D3, D6, and D7, respectively and in order. Further, the driving circuit can include bootstrap capacitor Cbs, diodes D11 and D12, and two groups of selection switches. For example, the power supply terminal of driver D2 or D6 can connect with bootstrap capacitor Cbs to charge bootstrap capacitor Cbs. When bootstrap capacitor Cbs is discharged, bootstrap capacitor Cbs can connect with positive and negative power supply terminals of drivers D1 or D5, in order selectively to provide the power supply voltage.

For example, the anodes of diodes D11 and D12 may respectively be connected with positive power supply terminals of drivers D2 and D6. Both the cathodes of diode D11 and D12 can connect with the anode of bootstrap capacitor Cbs. The first group of selection switches can include switches S1 and S2 configured to connect the cathode of bootstrap capacitor Cbs to one of the negative power supply terminals of drivers D1 and D5 selectively. Moreover, switch S1 can connect between common terminal SWH1 (e.g., the negative power supply terminal of driver D1) and the cathode of bootstrap capacitor Cbs, and switch S2 can connect between common terminal SWH2 (e.g., the negative power supply terminal of driver D5) and the cathode of bootstrap capacitor Cbs. Moreover, the second group of selection switches can include switches S3 and S4 configured to connect the anode of bootstrap capacitor Cbs with one of the positive power supply terminals of drivers D1 and D5 selectively.

Switch S3 can connect between the positive power supply terminal of driver D1 and the anode of bootstrap capacitor Cbs, and switch S4 can connect between the positive power supply terminal of driver D5 and the anode of bootstrap capacitor Cbs. That is, bootstrap capacitor Cbs may selectively provide the power supply voltage for one of drivers D1 and D5 by multiplexing bootstrap capacitor Cbs and controlling the selection switches. For example, power switches Q1 and Q3 in the first switched capacitor branch, and power switches Q6 and Q8 in the second switched capacitor branch (recorded as a first driving group), may be controlled by driving signal G1. Also, power switches Q2 and Q4 in the first switched capacitor branch, and power switches Q5 and Q7 in the second switched capacitor branch (recorded as a second driving group), may be controlled by driving signal G2. Switches S1 and S3 can be controlled by control signal Ga, and switches S2 and S4 can be controlled by control signal Gb.

Figure 5:
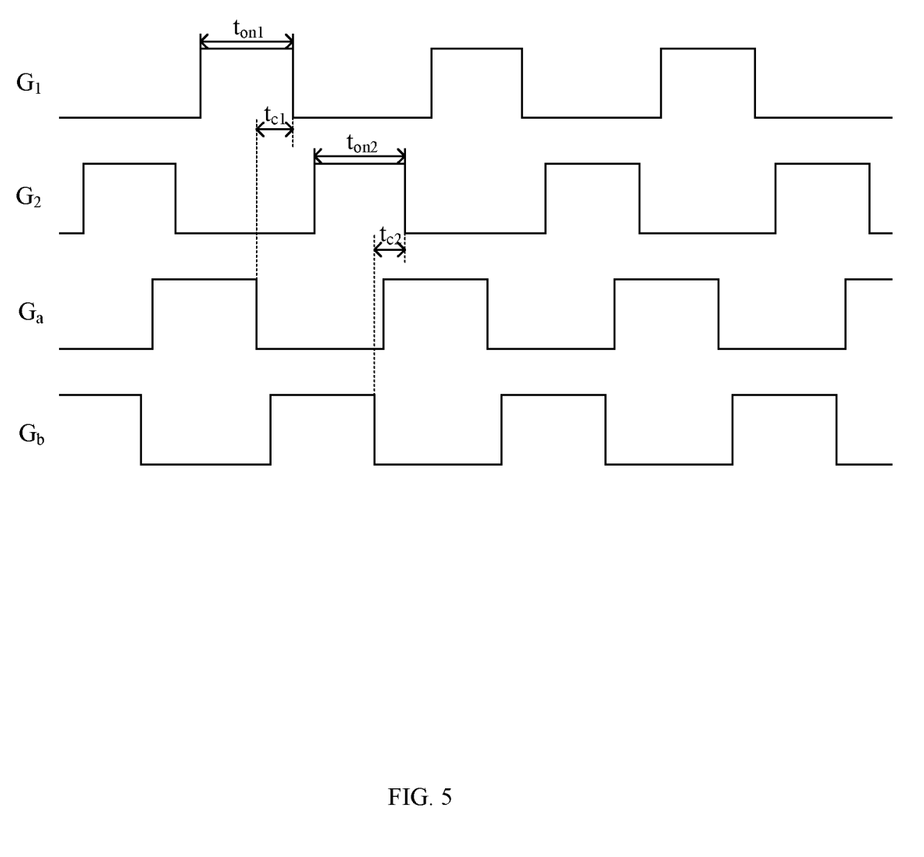
FIG. 5 is a waveform diagram of an example operation of the second example driving circuit for the switched capacitor converter, in accordance with embodiments of the present invention.

Referring now to FIG. 5, shown is a waveform diagram of an example operation of the second example driving circuit for the switched capacitor converter, in accordance with embodiments of the present invention. Referring back to FIG. 4, during the normal operation of the switched capacitor converter, the voltage received by voltage regulators LDO1 and LDO3 is ½*Vin. Then, voltage regulators LDO1 and LDO3 may respectively provide the power supply voltage for drivers D2 and D6 after power conversion, thereby driving power switches Q2 and Q6. Similarly, voltage regulators LDO2 and LDO4 can receive voltages VCF1 and VCF2 (which are equal to ½*Vin). Then, voltage regulators LDO2 and LDO4 may provide the power supply voltage for drivers D3 and D7 after power conversion, thereby driving power switches Q3 and Q7. Also, drivers D4 and D8 can be directly powered by reference voltage source VCC. For example, the power supply voltage generated from the voltage regulator can be equal to reference voltage source VCC.

Bootstrap capacitor Cbs may provide power supply voltage for drivers D1 and D5. When both driving signal G1 and control signal Gb are at a high level during predetermined time tc1, the switches in the first driving group and switches S2 and S4 can be turned on. Then, bootstrap capacitor Cbs can be charged through diode D12 and part of the power paths in the switched capacitor converter. The voltage across bootstrap capacitor Cbs is a difference between the voltage at the output terminal of voltage regulator LDO3 and voltage VSWH2 at common terminal SWH2. Since power switch Q6 is turned on during this period, the voltage across bootstrap capacitor Cbs is the voltage generated by voltage regulator LDO3, which can be equal to reference voltage source VCC. Then, the voltage across bootstrap capacitor Cbs may be provided to supply power to driver D5.

When driving signal G1 switches to be low, the first driving group can be controlled to be turned off. But, control signal Gb may remain at a high level at that time, so switches S2 and S4 may remain on. Further, when driving signal G2 switches to be at a high level, since bootstrap capacitor Cbs provides the power supply voltage for driver D5, power switch Q5 can be turned on normally. Moreover, other power switches of the second switch group may be normally on. Since the voltage across bootstrap capacitor Cbs is in a normal range, the extra voltage regulator may not be needed in this case.

When control signal Gb switches to a low level at a moment that is predetermined time tc2 earlier than the moment when driving signal G2 switches to a low level, control signal Ga switches to be at a high level. Thus, switches S1 and S3 can be turned on and the power switches in the second driving group may remain on during predetermined time tc2. Then, bootstrap capacitor Cbs can be charged by the voltage generated by voltage regulator LDO1 through diode D11 and part of the power paths in the switched capacitor converter. Further, when driving signal G2 switches to be at a low level, the second switch group can be controlled to be turned off. But, control signal Ga may remain at a high level at that time, so switches S1 and S3 may remain on. When driving signal G1 switches to be at a high level, since bootstrap capacitor Cbs provides the power supply voltage for driver D1, power switch Q1 can be turned on normally. Moreover, other power switches of the first switch group may normally be on. After that, control signal Ga switches to be at a low level at a moment that is predetermined time tc1 earlier than the moment when driving signal G1 switches to be at a low level, and then control signal Gb can be set to be at a high level. Therefore, bootstrap capacitor Cbs can be charged again and the process repeated, as described above.

Figure 6:
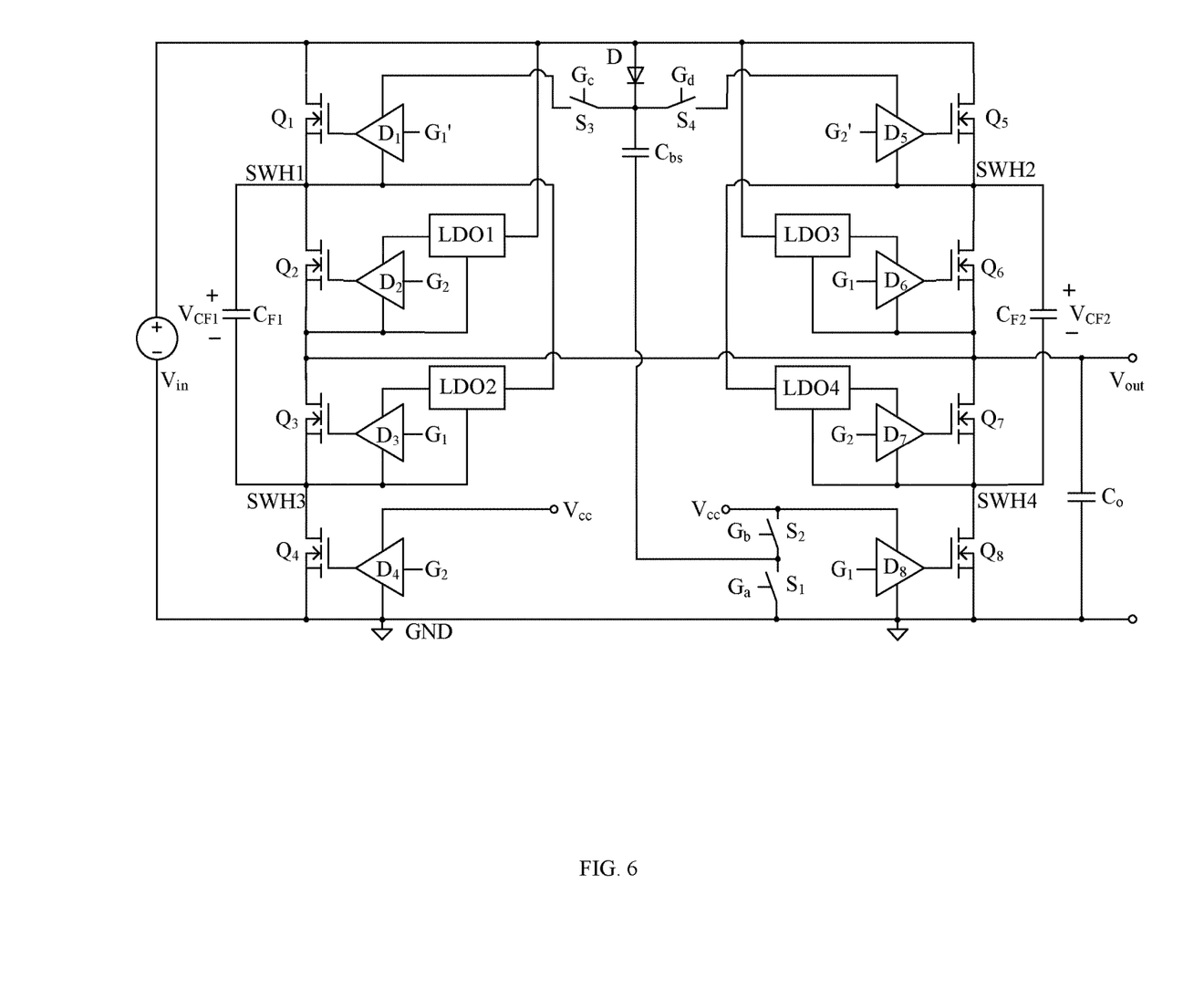
FIG. 6 is a schematic block diagram of a third example driving circuit for the switched capacitor converter, in accordance with embodiments of the present invention.

Referring now to FIG. 6, shown is a schematic block diagram of a third example driving circuit for the switched capacitor converter, in accordance with embodiments of the present invention. In certain embodiments, the driving circuit can include multiple drivers corresponding to the power switches and each power switch may be controlled by the corresponding driver. For example, power switches Q1-Q8 can be controlled by drivers D1-D8, respectively and in order. Here, drivers D4 and D8 can connect with reference ground GND, and the power supply voltage for drivers D4 and D8 may be provided by reference voltage source VCC. Further, the driving circuit can include voltage regulator LDO1-LDO4, and the output terminals of voltage regulator LDO1-LDO4 can connect with the power supply terminal of drivers D2, D3, D6, and D7, respectively and in order.

The driving circuit can include bootstrap capacitor Cbs, diode D, and two groups of selection switches. For example, bootstrap capacitor Cbs can be directly charged by input voltage Vin. When bootstrap capacitor Cbs is discharged, the anode of bootstrap capacitor Cbs can connect with one of the power supply terminals of drivers D1 and D5 selectively, in order to provide the power supply voltage. In addition, the cathode of bootstrap capacitor Cbs can connect with reference voltage source VCC to raise the potential of the anode of bootstrap capacitor Cbs. For example, the anode of diode D can connect with input voltage Vin, and the cathode of diode D can connect with the anode of bootstrap capacitor Cbs. The first group of selection switches can include switches S1 and S2 configured to selectively couple the cathode of bootstrap capacitor Cbs with one of reference voltage source VCC and reference ground GND.

Moreover, the common terminal of switches S1 and S2 can connect with the cathode of bootstrap capacitor Cbs. In addition, the second group of selection switches can include switches S3 and S4 configured to selectively connect the anode of bootstrap capacitor Cbs with one of the positive power supply terminals of drivers D1 and D5. Further, switch S3 can connect between the positive power supply terminal of driver D5 and the anode of bootstrap capacitor Cbs, and switch S4 can connect between the positive power supply terminal of driver D1 and the anode of bootstrap capacitor Cbs. That is, bootstrap capacitor Cbs may selectively provide the power supply voltage for one of drivers D1 and D5 by multiplexing bootstrap capacitor Cbs and controlling the selection switches. In certain embodiments, power switch Q1 can be controlled by driving signal G1'. Power switches Q3, Q6, and Q8 (recorded as a first driving group) may be controlled by driving signal G1. Power switch Q5 can be controlled by driving signal G2'. Power switches Q2, Q4, and Q7 (recorded as a second driving group) may be controlled by driving signal G2. Switches S1, S2, S3, and S4 may respectively be controlled by control signals Ga, Gb, Gc, and Gd.

Figure 7:
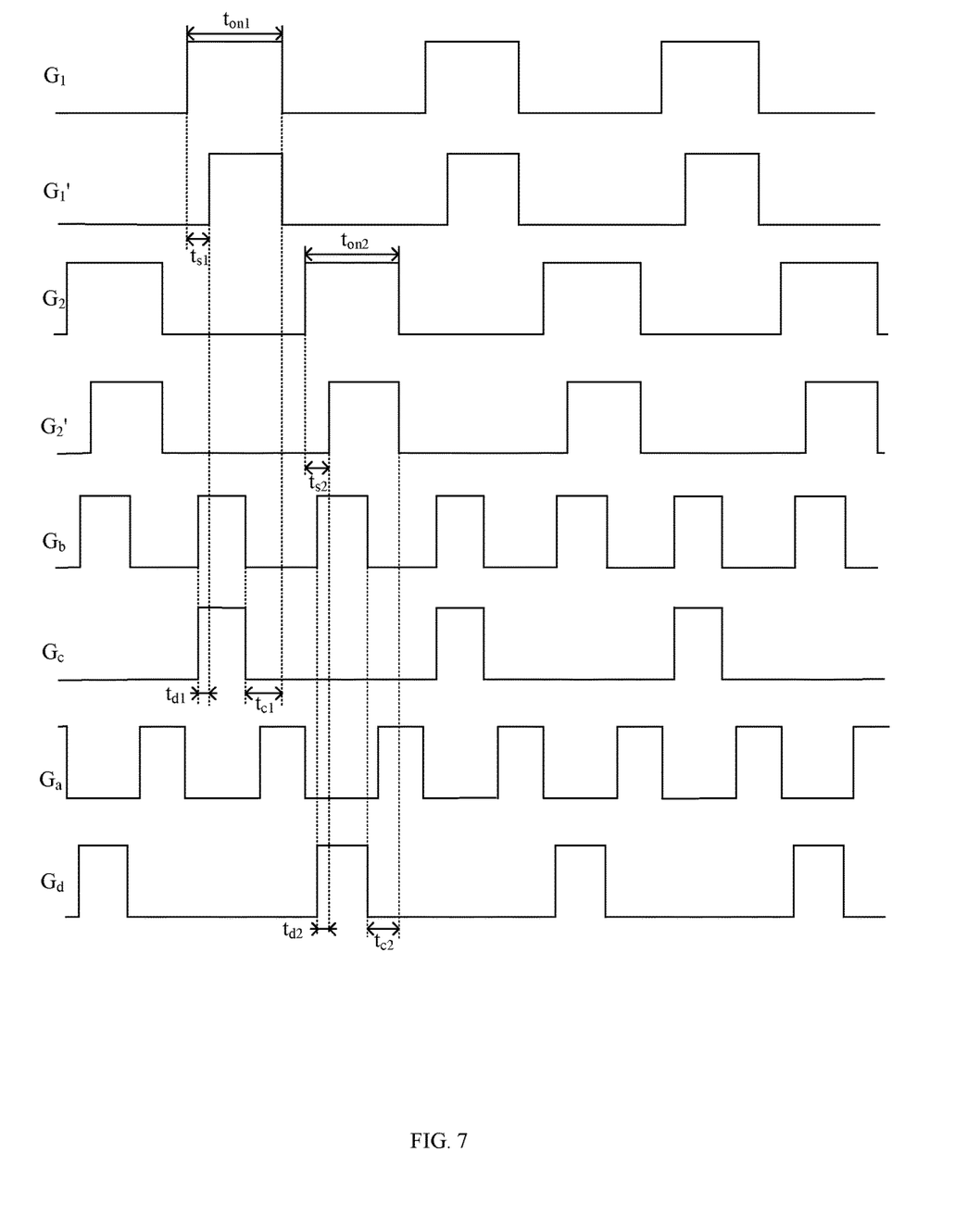
FIG. 7 is a waveform diagram of an example operation of the third example driving circuit for the switched capacitor converter, in accordance with embodiments of the present invention.

Referring now to FIG. 7, shown is a waveform diagram of an example driving signal of the third example driving circuit for the switched capacitor converter, in accordance with embodiments of the present invention. As is shown in FIG. 7, driving signals G1 and G2 are complementary. Further, a dead time is inserted between driving signals G1 and G2 to avoid that the upper power switch and the lower power switch are turned on simultaneously. Similarly, control signals Ga and Gb are complementary and a dead time is inserted between control signals Ga and Gb to avoid that switch S1 and S2 or switch S3 and S4 are turned on simultaneously.

In the embodiment, the rising edge of driving signal G1 is generated time ts1 earlier than that of driving signal G1'. The falling edges of driving signal G1 and driving signal G1' are generated at the same time, that is, the power switches in the first driving group are turned on time ts1 ahead of the turn-on moment of power switch. Also, the power switches in the first driving group and power switch Q1 are turned off simultaneously. In the embodiment, time ts1 is 1% of turn-on time ton1 of the first driving group. Further, the rising edge of driving signal G2 is generated time ts2 earlier than that of driving signal G2'. The falling edges of driving signals G2 and G2' can be generated at the same time, that is, the power switches in the second driving group are turned on time ts2 ahead of the turn-on moment of power switch Q5. Also, the power switches in the second driving group and power switch Q5 are turned off simultaneously. In the embodiment, time ts2 is 1% of turn-on time ton2 of the second driving group. Moreover, the falling edge of control signal Gc is generated predetermined time tc1 earlier than that of driving signal G1' and the rising edge of third control signal Gc is generated predetermined time td1 earlier than that of driving signal G1'.

Also, the falling edge of control signal Gd is generated predetermined time tc2 earlier than that of driving signal G2' and the rising edge of control signal Gd is generated predetermined time td2 earlier than that of driving signal G2'. In addition, the rising edge of control signal Gb is generated predetermined time td1 earlier than that of driving signal G1' and the falling edge of control signal Gb is generated predetermined time tc1 earlier than that of driving signal G1'. That is, switches S2 and S3 are turned on predetermined time td1 ahead of the turn-on moment of power switch Q1 and switches S2 and S3 are turned off third predetermined time tc1 ahead of the turn-off moment of power switch Q1. Here, predetermined time td1 is less than time ts1 and third predetermined time tc1 is less than the difference between turn-on time ton1 and time ts1. In the embodiment, predetermined time tc1 is half of turn-on time ton1. Similarly, switches S2 and S4 are turned on predetermined time td2 ahead of the turn-on moment of power switch Q5 and switches S2 and S4 are turned off predetermined time tc2 ahead of the turn-off moment of power switch Q5. Here, predetermined time td2 is less than time ts2 and predetermined time tc2 is less than the difference between turn-on time ton2 and time ts2. In the embodiment, predetermined time tc2 is half of turn-on time ton2.

Referring back to FIG. 6, the operation process of the driving circuit is further described. In the embodiments, during the normal operation of the switched capacitor converter, the voltage received by voltage regulators LDO1 and LDO3 is ½*Vin. Then, voltage regulators LDO1 and LDO3 may provide the power supply voltage for drivers D2 and D6 after voltage conversion, thereby driving power switches Q2 and Q6. Similarly, voltage regulators LDO2 and LDO4 can respectively receive voltages VCF1 and VCF2 (which are equal to ½*Vin). Then, voltage regulators LDO2 and LDO4 may provide the power supply voltage for drivers D3 and D7 after voltage conversion, thereby driving power switches Q3 and Q7. For example, the power supply voltage generated from the voltage regulator is equal to reference voltage source VCC.

Bootstrap capacitor Cbs may provide the power supply voltage for drivers D1 and D5. When control signal Ga is at a high level, switch S1 can be turned on. Then, input voltage Vin can charge bootstrap capacitor Cbs by diode D, and the voltage across bootstrap capacitor Cbs is input voltage Vin. Further, when driving signal G1 switches to be active (e.g., at a high level), power switches Q3, Q6, and Q8 can be turned on. After a short time (e.g., the difference between time ts1 and predetermined time td1), control signals Gb and Gc may simultaneously be active. Then, switches S2 and S3 can be turned on, the cathode of bootstrap capacitor Cbs can connect with reference voltage source Vcc, and the potential of the anode of bootstrap capacitor Cbs may be the sum of input voltage Vin and reference voltage source Vcc. In such a case, bootstrap capacitor Cbs may provide the power supply voltage for driver D1, and the power supply voltage is the difference between Vin+Vcc and the voltage at node SWH1 (which is equal to Vin at this time). That is, the power supply voltage for driver D1 is reference voltage source Vcc. After predetermined time td1, driving signal G1' may be activated, such that power switch Q1 is turned on. For example, the turn-on moment of power switch Q1 may lag that of the first driving group by time ts1. Since time ts1 is relatively short, this may not have influence on the operation of the converter. Further, when control signals Gb and Gc are inactive predetermined time tc1 ahead of the turn-off moment of power switch Q1, switches S2 and S3 can be controlled to be turned off.

After the dead time has elapsed, control signal Ga can be at a high level, and switch S1 may be turned on. Then, input voltage Vin can charge bootstrap capacitor Cbs by diode D again. Further, when driving signal G2 switches to be active, switches Q2, Q4, and Q7 can be turned on. After a short time (e.g., the difference between time ts2 and predetermined time td2), control signals Gb and Gd may simultaneously be activated. Then, switches S2 and S4 can be turned on, such that the cathode of bootstrap capacitor Cbs can connect with reference voltage source Vcc, and the potential of the anode of bootstrap capacitor Cbs may be raised to the sum of input voltage Vin and reference voltage source Vcc. In such a case, bootstrap capacitor Cbs may provide the power supply voltage for driver D5, and the power supply voltage is reference voltage source Vcc. After predetermined time td2 as elapsed, driving signal G2' may be activated, such that power switch Q5 is turned on. For example, the turn-on moment of power switch Q5 may lag the turn-on moment of the second driving group by time ts2. Since time ts2 is relatively short, this may not have influence on the operation of the converter. Further, when control signals Gb and Gc are inactive predetermined time tc2 ahead of the turn-off moment of power switch Q5, power switches S2 and S3 can be controlled to be turned off.

After the dead time has elapsed, control signal Ga may be at a high level, and switch S1 can be turned on. Then, input voltage Vin can charge bootstrap capacitor Cbs by diode D again, and the operation process repeated as described above. In certain embodiments, the switched capacitor converter can include two switched capacitor. When the switched capacitor converter includes 2N switched capacitor branches, where N is a positive integer, every two branches multiplex one bootstrap capacitor, in order to provide the power supply voltage to the drivers for the two power switches connected to the input voltage of the converter. In such a case, the bootstrap capacitor can be charged during part of conduction time of one power switch, and may provide power to the driver corresponding to the other power switch before it is turned on.

In some embodiments, there are N switched capacitor branches in the switched capacitor converter, where N is greater than 1 and is an integer. N switched capacitor branches can multiplex one same bootstrap capacitor, in order to provide the power supply power to all the drivers for the power switches that connected with input voltage; that is, there is one bootstrap capacitor in the driving circuit. In such a case, the bootstrap capacitor can be charged during part of conduction time of one power switch, and may provide power to the driver corresponding to a next power switch before the next power switch is turned on.

In particular embodiments, each switched capacitor branch can include two switch groups, and when there are N switch groups, the driver for the power switch that is connected to the input voltage may be powered through the bootstrap capacitor, and the driver for the power switch that is connected to the reference ground may be directly powered by the reference voltage source. The drivers for the other power switches can be connected in a certain way to be supplied with a voltage of 1/N of the input voltage during normal operation of the converter. The negative power supply terminal can be coupled to the source terminal of the power switch, and the positive power supply terminal may be coupled to the drain terminal of the previous adjacent power switch.

As mentioned above, the power supply voltage of the drivers for the power switches connected with the input voltage of the switched capacitor converter may be provided by multiplexing one bootstrap capacitor. In one switching cycle, the charging time of the bootstrap capacitor can coincide with part of the conduction time of one of the power switches connected with the input voltage, and the bootstrap capacitor may discharge to provide the power supply voltage to the corresponding driver before another power switch is turned on. Moreover, the charging voltage of the bootstrap capacitor may be related to the input voltage.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A driving circuit for a switched capacitor converter having first and second switched capacitor branches, wherein the first switched capacitor branch comprises first and second switch groups connected between an input voltage and a reference ground, the second switched capacitor branch comprises third and fourth switch groups connected between the input voltage and the reference ground, and each switch group comprises an upper power switch and a lower power switch, the driving circuit comprising:
   a) a plurality of drivers configured to correspondingly drive each power switch in the switched capacitor converter;
   b) a bootstrap capacitor configured to provide a power supply voltage only for each driver that is configured to drive the upper power switches that are directly connected to the input voltage of the switched capacitor converter; and
   c) wherein a charging voltage for charging the bootstrap capacitor is not greater than the input voltage of the switched capacitor converter.

2. The driving circuit of claim 1, wherein:
   a) a charging time for the bootstrap capacitor coincides with a conduction time of one of the upper power switches connected with the input voltage of the switched capacitor converter; and
   b) the power supply voltage for the driver is provided by the bootstrap capacitor before another upper power switch is turned on.

3. The driving circuit of claim 2, wherein:
   a) the bootstrap capacitor is charged a first predetermined time ahead of a turn-off moment of the upper power switch in the first switch group, and provides the power supply voltage for the driver corresponding to the upper power switch in the third switch group; and
   b) the bootstrap capacitor is charged a second predetermined time ahead of a turn-off moment of the upper power switch in the third switch group, and provides the power supply voltage for the driver corresponding to the upper power switch in the first switch group.

4. The driving circuit of claim 3, wherein the first predetermined time is equal to the second predetermined time.

5. The driving circuit of claim 4, wherein the first predetermined time is half of the conduction time of the upper power switch in the first switch group, and the second predetermined time is half of the conduction time of the upper power switch in the third switch group.

6. The driving circuit of claim 1, wherein the bootstrap capacitor is charged through part of power paths in the switched capacitor converter during normal operation.

7. The driving circuit of claim 6, wherein charging paths for the bootstrap capacitor pass through the lower power switches in each switch group in the first switched capacitor branch, or pass through the lower power switches in each switch group in the second switched capacitor branch.

8. The driving circuit of claim 6, wherein the bootstrap capacitor is charged by the input voltage of the switched capacitor converter until a voltage across the bootstrap capacitor is half of the input voltage.

9. The driving circuit of claim 6, wherein when each switched capacitor branch comprises N switch groups, the voltage across the bootstrap capacitor is 1/N of the input voltage, and N is a positive integer greater than 1.

10. The driving circuit of claim 9, wherein when the bootstrap capacitor is discharged, two terminals of the bootstrap capacitor are selectively connected to the driver corresponding to the upper power switch in the first or third switch group, in order to provide the power supply voltage for the driver.

11. The driving circuit of claim 6, wherein the bootstrap capacitor is charged by the power supply voltage for the driver corresponding to the lower power switch in the first or third switch group, and the power supply voltage for the driver is obtained by converting the input voltage.

12. The driving circuit of claim 1, wherein the bootstrap capacitor is directly charged by the input voltage until a voltage across the bootstrap capacitor is equal to the input voltage.

13. The driving circuit of claim 12, wherein when the bootstrap capacitor is discharged, an anode of the bootstrap capacitor is selectively connected to a positive power supply terminal of the driver corresponding to the upper power switch in the first or third switch group and a cathode of the bootstrap capacitor is connected with a reference voltage source.

14. The driving circuit of claim 1, further comprising two groups of selection switches, wherein:
   a) a first group of selection switches is configured to connect the cathode of the bootstrap capacitor with a negative power supply terminal of the driver corresponding to the upper power switch in the first or third switch group selectively;
   b) a second group of selection switches is configured to connect the anode of the bootstrap capacitor with a positive power supply terminal of the driver corresponding to the upper power switch in the first or third switch group selectively; and
   c) the negative power supply terminal of the driver corresponding to the upper power switch in the first or third switch group is a common terminal of two power switches in the first group or third group.

15. The driving circuit of claim 14, wherein:
   a) each group of selection switches comprises two switches that are controlled by first and second control signals that are complementary;

b) the falling edge of the first control signal is generated a first predetermined time ahead of that of a first driving signal; and c) the falling edge of the second control signal is generated a second predetermined time ahead of that of a second driving signal.

16. The driving circuit of claim 15, wherein:

a) the first driving signal is configured to drive the upper power switches in the first switched capacitor branch and the lower power switches in the second switched capacitor branch; and b) the second driving signal is configured to drive the lower power switches in the first switched capacitor branch and the upper power switches in the second switched capacitor branch.

17. The driving circuit of claim 1, further comprising two groups of selection switches, wherein:

a) a first group of selection switches is configured to selectively connect a cathode of the bootstrap capacitor with the reference ground or a reference voltage source; and b) a second group of selection switches is configured to connect an anode of the bootstrap capacitor with a positive power supply terminal of the driver corresponding to the upper power switch in the first or third switch group selectively.

18. The driving circuit of claim 1, further comprising at least one diode, each of which being configured to connect between a power supply source in a charging path for the bootstrap capacitor and an anode of the bootstrap capacitor.

19. The driving circuit of claim 1, further comprising a plurality of voltage regulators configured to provide the power supply voltage for the drivers.

20. The driving circuit of claim 1, wherein the power supply voltage for drivers corresponding to lower power switches connected to the reference ground is provided by a reference voltage source.

* * * * *